United States Patent
Evans

(10) Patent No.: US 6,662,106 B2
(45) Date of Patent: Dec. 9, 2003

(54) NAVIGATION SYSTEM THAT TAKES INTO ACCOUNT DYNAMIC ROAD CONDITIONS

(75) Inventor: Tracy J. Evans, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 127 days.

(21) Appl. No.: 09/834,341

(22) Filed: Apr. 13, 2001

(65) Prior Publication Data

US 2002/0152026 A1 Oct. 17, 2002

(51) Int. Cl.[7] .............................................. G61C 21/00
(52) U.S. Cl. ...................................... 701/210; 701/200
(58) Field of Search .................................. 701/200, 210, 701/211, 213, 208; 342/357.13, 357.09, 357.12, 357.06

(56) References Cited

U.S. PATENT DOCUMENTS

| | | | |
|---|---|---|---|
| 6,216,088 B1 | * | 4/2001 | Schulz et al. ............... 701/209 |
| 6,377,210 B1 | * | 4/2002 | Moore .................... 342/357.13 |
| 6,421,606 B1 | * | 7/2002 | Asai et al. .................. 701/209 |
| 6,429,812 B1 | * | 8/2002 | Hoffberg ................. 342/357.1 |
| 6,484,092 B2 | * | 11/2002 | Seibel ........................ 701/209 |

OTHER PUBLICATIONS

StreetPilot™ GPS owner's manual and reference guide available from Garmin International Inc., 1200 E. 151st Street, Olathe, Kansas 66062, 1999–2000, pp. viii, 14–18.

* cited by examiner

Primary Examiner—Yonel Beaulieu

(57) ABSTRACT

Mapping information is presented to a user. Information about dynamic road conditions is integrated into static mapping data to generate dynamic mapping data. The dynamic mapping data is displayed to a user via a display. For example, the dynamic road conditions are obtained from a detector that detects dynamic road conditions. The detector is, for example, a safety warning system detector. Alternatively, the detector may be some other type of detecting device such as a radar detector. The information about dynamic road conditions can also be obtained from a wireless service that accumulates information about dynamic road conditions. Any information about dynamic road conditions obtained from a detector that detects dynamic road conditions can be forwarded to the wireless service to make the information available to other users with access to the wireless service. Positioning information can be used to display to the user a current position relative to the dynamic mapping data. For example the positioning information is obtained from a global positioning system (GPS) or from some other positioning methodology. In order to generate an optimal route for travel between two locations, information about dynamic road conditions can be integrated with the static mapping data to assure a best current route is determined.

20 Claims, 3 Drawing Sheets

NAVIGATION SYSTEM THAT TAKES INTO ACCOUNT DYNAMIC ROAD CONDITIONS

BACKGROUND

The present invention pertains to mapping and routing systems and pertains particularly to road mapping that takes into account dynamic road conditions.

Global positioning system (GPS) user equipment consists of an antenna, a signal processing unit, and associated electronics and displays. The GPS user equipment receives signals from the global positioning system satellites to obtain position, velocity, and time solution.

GPS systems have been combined with detailed electronic maps to aid in the navigation of automobiles. For example, Garmin International, Inc., distributes a StreetPilot™ GPS navigation tool that contains a reference base map showing Interstate, U.S., and State highways, plus rivers and lakes in the U.S., Canada, and Mexico, with main arterial streets shown in metropolitan areas. Plug-ins can be used for street-level map detail and access to business listings and points of interest in a particular area. Upon entry of a street address or points of interest (such as restaurants, hotels, gas stations, banks, and shopping areas), the navigation tool will display the location on a map along with current vehicle location. See, StreetPilot™ GPS owner's manual and reference guide available from Garmin International, Inc., 1200 E. 151st Street, Olathe, Kans. 66062, 1999-2000, pp. viii, 14-18.

While GPS systems can be of significant help to travelers, current systems when performing routing do not take into account dynamic road conditions such as construction, accidents or daily traffic patterns. This can result in selection of a route that is less than optimal.

SUMMARY OF THE INVENTION

In accordance with the preferred embodiment of the present invention mapping information is presented to a user. Information about dynamic road conditions is integrated into static mapping data to generate dynamic mapping data. The dynamic mapping data is displayed to a user via a display.

For example, the dynamic road conditions are obtained from a detector that detects dynamic road conditions. The detector is, for example, a safety warning system detector. Alternatively, the detector may be some other type of detecting device such as a radar detector. The information about dynamic road conditions can also be obtained from a wireless service that accumulates information about dynamic road conditions. Any information about dynamic road conditions obtained from a detector that detects dynamic road conditions can be forwarded to the wireless service to make the information available to other users with access to the wireless service.

Also, in the preferred embodiments of the present invention positioning information is used to display to the user a current position relative to the dynamic mapping data. For example the positioning information is obtained from a global positioning system (GPS) or from some other positioning methodology.

In order to generate an optimal route for travel between two locations, information about dynamic road conditions can be integrated into mapping data. For example, integration of dynamic road conditions can include adjusting estimated traveling speeds when traversing roadways or highways affected by dynamic road conditions. Thus, the mapping data used for routing information is modified to take into account the known dynamic road conditions in order to generate dynamic routing data. Based on the dynamic routing data, routing information (e.g., an optimum route) is generated.

The present invention solves the problem of dynamically routing vehicles around road construction, accidents and speed traps.

DESCRIPTION OF THE PREFERRED EMBODIMENT

Figure 1:
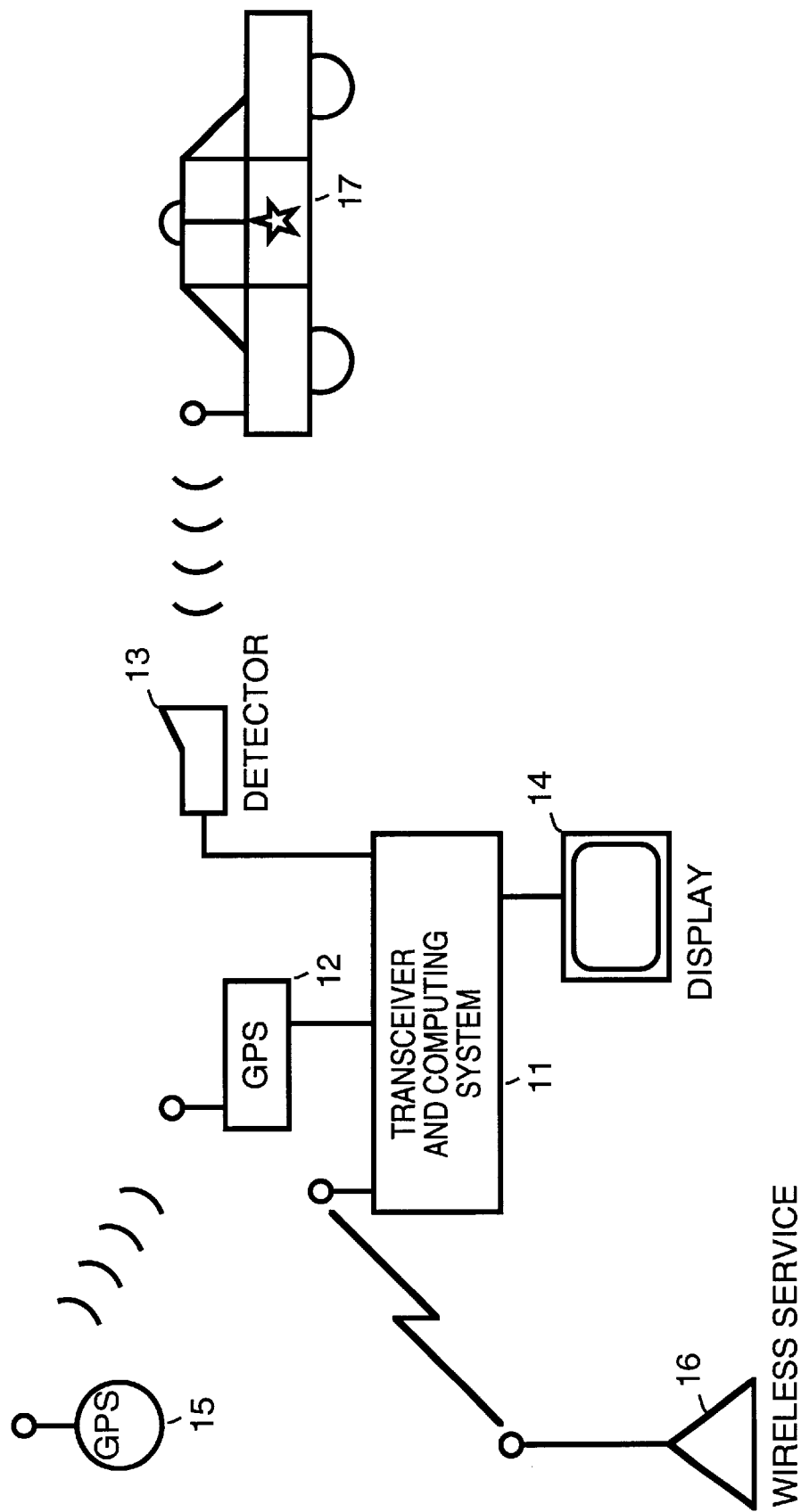
FIG. 1 is a simplified block diagram that shows a navigation system that takes into account dynamic road conditions in accordance with a preferred embodiment of the present invention.

FIG. 1 is a simplified block diagram that shows a navigation system that takes into account dynamic road conditions. Global positioning system (GPS) satellites, represented by a GPS satellite 15 provide positioning information to a GPS receiver 12. Alternatively, another positioning system may be used to provide positioning information. A transceiver and computing system 11 receives positioning information from GPS receiver 12 and uses the positioning information for mapping and routing. The mapping and routing information is displayed to a user via a display 14. GPS receiver 12, transceiver and computing system 11 and display 14 can be integrated into a single hardware package. Alternatively, GPS receiver 12 can be a separate hardware system connectable to transceiver and computing system 11. Likewise, display 14 can be integrated with transceiver and computing system 11 (e.g., as in a laptop or handheld computing system) or may be housed separately (for example in the dashboard of a car).

A detector 13 is used to detect dynamic road conditions in the immediate surrounding area of a vehicle in which transceiver and computing system 11 resides. Detector 13 is, for example, a safety warning system (SWS) compatible "smart" detector. In current SWS technology, when a "smart" detector encounters a signal known as a continuous wave on the frequency used by SWS transmitters, it stops scanning and waits for a message display code. Depending on the signal from the transmitter, the detector can display the message category or one of 60 messages. The smart detector can warn, for example, of an upcoming hazard, such as a utility crew at work, severe weather conditions or a deer-crossing area. An SWS receiver can also describe traffic delays, detours and even roadside services SWS transmitters are often resident in emergency vehicles (represented in FIG. 1 by emergency vehicle 17) such as police cars, fire trucks and ambulances. Different signals are transmitted depending upon whether the emergency vehicle is on the move with sirens and emergency lights activated or when stopped at the scene of an accident or other hazardous situation. SWS transmitters are also used to warn of a train approaching a crossing, ice-prone bridges, blind intersections, sharp curves, rock slides, poor driving conditions, school buses, school zones and transportation of oversize loads.

A SWS transmitter can follow an initial message with a second message. For instance, the first message might indicate that a vehicle is approaching a work area or school zone, the follow-up message can include the speed limit for the location. For some categories of messages such as, Highway Construction/Maintenance, Highway Hazard Zone Advisory, Weather Related Hazards, and Travel Information/Convenience, the SWS transmitter is typically stationary. For other categories of messages, for example, Fast/Slow Moving Vehicles, the transmitter is within a moving vehicle. For more information on SWS technology, see, for example, the internet at the following web addresses: http://www.swslc.com/brochure.htm; or http://www.safetyradar.com.

Alternatively, detector 13 could be another type of detector, for example a radar detector that warns a user of speed traps.

Transceiver and computing system 11 integrates the information provided by detector 13 into the maps and routing information used by transceiver and computing system 11. Additionally, this information is uploaded to wireless service 16 for broadcast to other vehicles in the vicinity or to any other vehicles to which the information about dynamic road conditions is pertinent.

Transceiver and computing system is in communication with wireless service 16. Wireless service 16 accumulates information related to dynamic road conditions from vehicles equipped with navigation systems similar to transceiving and computing system 11 shown in FIG. 1. The information related to dynamic road conditions includes, for example, information about road construction, accidents and slow traffic, etc. obtained from an SWS detector or other detector. The information can also include the traveling speed of the vehicle. In addition, wireless service 16 can obtain additional information from other sources such as state or county transportation services, weather stations, traffic reports and so on. This information is accumulated by wireless service 16 and then forwarded to vehicles to which the information applies. The information is used to dynamically update mapping information and routing information.

Figure 2:
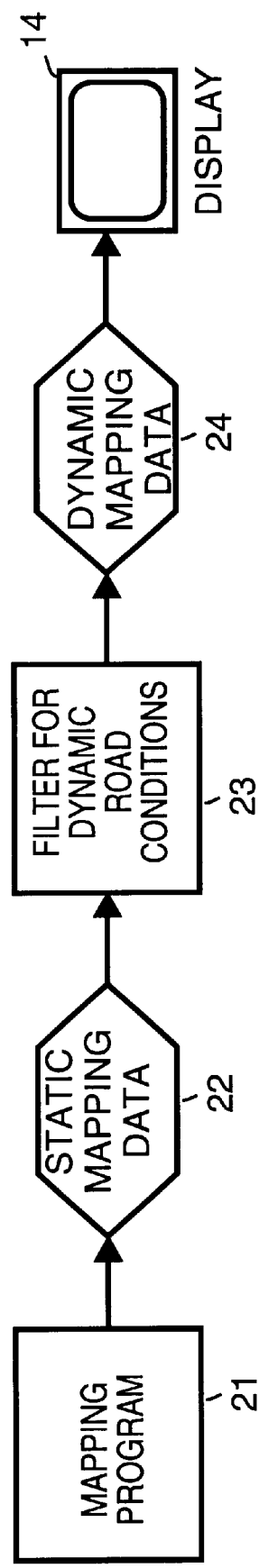
FIG. 2 is a simplified block diagram showing information flow in a navigation system so as to take into account dynamic road conditions when presenting mapping information to a user in accordance with a preferred embodiment of the present invention.

FIG. 2 shows information flow within transceiver and computing system 11 when presenting mapping information to a user. A mapping program 21 resides within transceiver and computing system 11. Mapping program 21 generates static mapping data 22. For example, mapping program 21 is a standard mapping program such as Street Atlas USA or AAA Map'n'Go available from DeLorme. Alternatively, mapping program 21 is a mapping program designed specifically for use when taking into account dynamic road conditions.

A filter for dynamic road conditions 23 receives static mapping data 22 and generates dynamic mapping data 24. For example, dynamic mapping data 24 includes static mapping data 22 plus the addition of information about road construction, accidents and slow traffic, etc. obtained from detector 13 or wireless service 16. Dynamic mapping data 24 is presented to the user via display 14. Dynamic mapping data 24, for example, is displayed in the form of a recommended route, or as a map display that includes information about dynamic road conditions.

Figure 3:
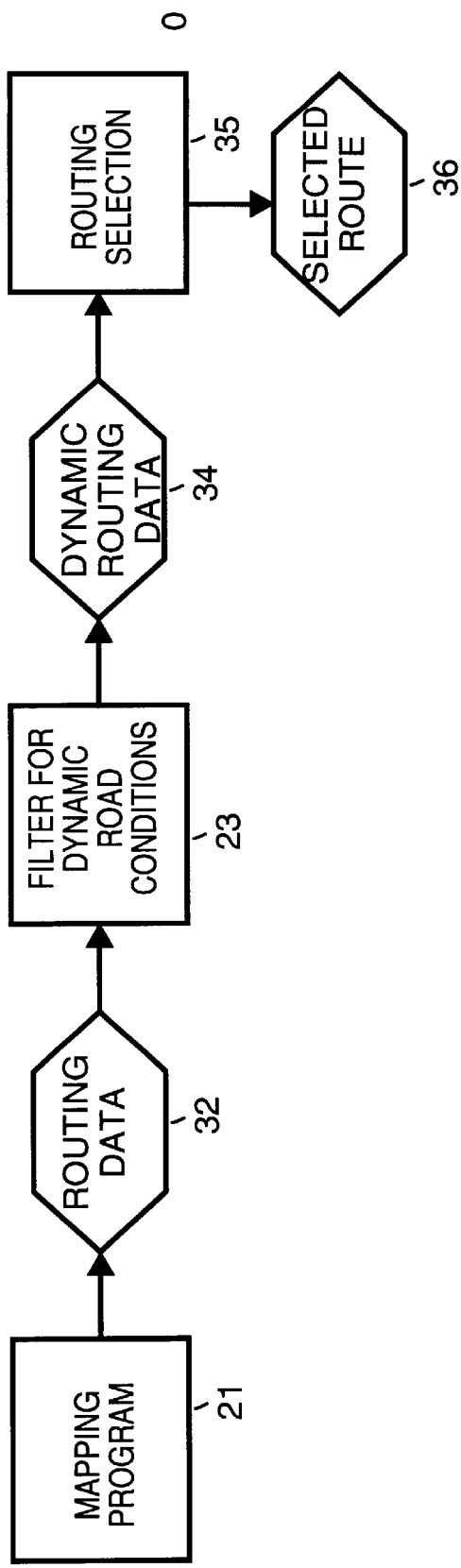
FIG. 3 is a simplified block diagram showing information flow in a navigation system so as to take into account dynamic road conditions when routing information for a user in accordance with a preferred embodiment of the present invention.

FIG. 3 shows information flow within transceiver and computing system 11 when preparing routing information for a user. Mapping program 21 generates routing data 32 using static mapping data. In essence, routing data 32 is a subset of all available static mapping data. Filter for dynamic road conditions 23 receives routing data 32 and generates dynamic routing data 34. For example, dynamic routing data 34 includes routing data 32 adjusted for available information about dynamic road conditions such as road construction, accidents and slow traffic, etc. obtained from detector 13 or wireless service 16. The information about dynamic road conditions is used, for example, to adjust estimated travel speeds across roads and highways used when routing selection module 36 selects an optimum route 36 between two locations. In addition, the information about dynamic road conditions is used by routing selection module 36 to present warnings to a user about possible obstacles, hazards and so on that are present at locations along a selected route.

Alternatively, routing data 32 can be directions to a location or a subset of directions to a location (e.g., a warning about an upcoming turn). In this case, dynamic routing data can be used to determine whether alternative directions are preferable or to generate warnings to be issued while the user is traveling a particular route. These warnings can be displayed to a user using display 14 or spoken to a user using computer generated speech technology.

While FIG. 2 and FIG. 3 show embodiments of the present invention where filter for dynamic road conditions 23 is used to modify information obtained from mapping program 21, as will be understood by persons of ordinary skill in the art, in alternative embodiments of the present invention, the functionality of filter for dynamic road conditions 23 can be integrated into mapping program 21.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A method for presenting mapping information to a user comprising the following step:
   (a) integrating information about dynamic road conditions into static mapping data to generate dynamic mapping data; and,
   (b) displaying the dynamic mapping data to the user via a display.

2. A method as in claim 1 additionally comprising:
   (c) using positioning information to also display to the user a current position relative to the dynamic mapping data.

3. A method as in claim 1 additionally comprising the following step performed before step (a):
   (c) obtaining the dynamic road conditions from a detector that detects dynamic road conditions.

4. A method as in claim 1 additionally comprising the following step performed before step (a):
   (c) obtaining the dynamic road conditions from a detector, the detector being a safety warning system detector.

5. A method as in claim 1 additionally comprising the following step performed before step (a):
   (c) obtaining information about the dynamic road conditions from a detector, the detector being a radar detector.

6. A method as in claim 1 additionally comprising the following step performed before step (a):
   (c) obtaining the information about dynamic road conditions from a wireless service that accumulates information about dynamic road conditions.

7. A method as in claim 1 additionally comprising the following steps:
   (c) obtaining the information about dynamic road conditions from a detector, that detects dynamic road conditions; and,
   (b) forwarding the information about dynamic road conditions to a wireless service that accumulates information about dynamic road conditions.

8. A method for presenting routing information to a user comprising the following step:
   (a) integrating information about dynamic road conditions into routing information obtained using static mapping data to generate dynamic routing data; and,
   (b) generating routing information based on the dynamic routing data.

9. A method as in claim 8 additionally comprising the following step performed before step (a):
   (c) obtaining the dynamic road conditions from a detector that detects dynamic road conditions.

10. A method as in claim 8 additionally comprising the following step performed before step (a):
    (c) obtaining the dynamic road conditions from a detector, the detector being a safety warning system detector.

11. A method as in claim 8 additionally comprising the following step performed before step (a):
    (c) obtaining information about the dynamic road conditions from a detector, the detector being a radar detector.

12. A method as in claim 8 additionally comprising the following step performed before step (a):
    (c) obtaining the information about dynamic road conditions from a wireless service that accumulates information about dynamic road conditions.

13. A method as in claim 8 additionally comprising the following steps:
    (c) obtaining the information about dynamic road conditions from a detector, that detects dynamic road conditions; and,
    (b) forwarding the information about dynamic road conditions to a wireless service that accumulates information about dynamic road conditions.

14. A navigation system comprising:
    mapping data source for providing static mapping data;
    dynamic road condition information procurement means for procuring information about dynamic road conditions; and,
    integration means for integrating the information about dynamic road conditions into the static mapping data.

15. A navigation system as in claim 14 additionally comprising:
    a receiver for receiving positioning information used to indicate a current position relative to the dynamic mapping data.

16. A navigation system as in claim 14 additionally comprising:
    a transmitter for forwarding the information about dynamic road conditions to a wireless service that accumulates information about dynamic road conditions.

17. A navigation system as in claim 14 wherein the dynamic road condition information procurement means comprises a detector that detects dynamic road conditions.

18. A navigation system as in claim 14 wherein the dynamic road condition information procurement means comprises a detector that detects dynamic road conditions, the detector being a safety warning system detector.

19. A navigation system as in claim 14 wherein the dynamic road condition information procurement means comprises a detector that detects dynamic road conditions, the detector being a radar detector.

20. A navigation system as in claim 14 wherein the dynamic road condition information procurement means is a receiver that receives the information about dynamic road conditions from a wireless service that accumulates information about dynamic road conditions.

* * * * *